(12) United States Patent
Felkl et al.

(10) Patent No.: US 11,299,980 B2
(45) Date of Patent: Apr. 12, 2022

(54) METHOD FOR FRACTURE ACTIVITY MONITORING AND PRESSURE WAVE RESONANCE ANALYSES FOR ESTIMATING GEOPHYSICAL PARAMETERS OF HYDRAULIC FRACTURES USING FRACTURE WAVES

(71) Applicant: Seismos Inc., Austin, TX (US)

(72) Inventors: Jakub Felkl, Austin, TX (US); Youli Quan, Houston, TX (US); Junwei Zhang, Austin, TX (US)

(73) Assignee: Seismos Inc., Austin, TX (US)

( * ) Notice: Subject to any disclaimer, the term of this patent is extended or adjusted under 35 U.S.C. 154(b) by 887 days.

(21) Appl. No.: 15/841,069

(22) Filed: Dec. 13, 2017

(65) Prior Publication Data
US 2019/0055836 A1 Feb. 21, 2019

Related U.S. Application Data

(63) Continuation of application No. PCT/US2017/047679, filed on Aug. 18, 2017.

(51) Int. Cl.
*E21B 47/06* (2012.01)
*E21B 43/26* (2006.01)
(Continued)

(52) U.S. Cl.
CPC .............. *E21B 47/06* (2013.01); *E21B 43/26* (2013.01); *E21B 47/117* (2020.05); *E21B 49/00* (2013.01);
(Continued)

(58) Field of Classification Search
CPC ...... E21B 47/06; E21B 47/117; E21B 49/008; E21B 43/26; E21B 49/00; E21B 43/267;
(Continued)

(56) References Cited

U.S. PATENT DOCUMENTS

| 3,406,776 A | 10/1968 | Henry |
| 4,858,130 A | 8/1989 | Widrow |

(Continued)

FOREIGN PATENT DOCUMENTS

| WO | 1998/034105 A1 | 8/1998 |
| WO | 1998034105 A1 | 8/1998 |

OTHER PUBLICATIONS

Cheng et al. "Modeling of low-frequency Stoneley-wave propagation in an irregular borehole", Aug. 1997, Geophysics, vol. 62, pp. 1047-1058 (Year: 1997).*

(Continued)

*Primary Examiner* — Mohamed Charioui
(74) *Attorney, Agent, or Firm* — Richard A. Fagin

(57) ABSTRACT

A method for characterizing a hydraulic fracture treatment both operationally and in a subsurface formation includes inducing a pressure change in a well drilled through the subsurface formation. At least one of pressure and a time derivative of pressure is measured in the well for a selected length of time. At least one physical parameter of at least one fracture is determined using the measured pressure and/or the time derivative of pressure. A method of evaluating hydraulic fracturing treatment and operations by monitoring resonant structures present while fracturing. A method for characterizing hydraulic fracturing rate uses microseismic event count measured through the wellbore and its real-time implementation.

53 Claims, 13 Drawing Sheets

(51) Int. Cl.

| | | |
|---|---|---|
| *E21B 49/00* | (2006.01) | |
| *E21B 43/267* | (2006.01) | |
| *G01V 1/50* | (2006.01) | |
| *G01V 1/40* | (2006.01) | |
| *G01V 1/48* | (2006.01) | |
| *E21B 47/117* | (2012.01) | |
| *G01V 99/00* | (2009.01) | |

(52) U.S. Cl.
CPC .............. *E21B 49/008* (2013.01); *G01V 1/40* (2013.01); *G01V 1/48* (2013.01); *G01V 99/005* (2013.01); *E21B 43/267* (2013.01); *G01V 1/50* (2013.01); *G01V 2210/121* (2013.01); *G01V 2210/123* (2013.01); *G01V 2210/1234* (2013.01); *G01V 2210/54* (2013.01); *G01V 2210/646* (2013.01)

(58) Field of Classification Search
CPC .......... G01V 1/40; G01V 1/48; G01V 99/005; G01V 2210/123; G01V 2210/54; G01V 2210/121; G01V 2210/646; G01V 2210/1234; G01V 1/50
See application file for complete search history.

(56) References Cited

U.S. PATENT DOCUMENTS

| | | | | |
|---|---|---|---|---|
| 6,327,538 | B1* | 12/2001 | Chin | G01V 1/50 |
| | | | | 702/18 |
| 7,819,188 | B2 | 10/2010 | Auzerais et al. | |
| 10,267,941 | B2* | 4/2019 | Collins | G01V 1/50 |
| 2002/0188407 | A1 | 12/2002 | Khan | |
| 2008/0164021 | A1 | 7/2008 | Dykstra | |
| 2010/0157737 | A1 | 6/2010 | Miller et al. | |
| 2011/0120718 | A1 | 5/2011 | Craig | |
| 2011/0218737 | A1 | 9/2011 | Gulati | |
| 2013/0333879 | A1* | 12/2013 | Rasheed | E21B 7/28 |
| | | | | 166/250.1 |
| 2014/0017092 | A1 | 1/2014 | Brackel | |
| 2014/0262232 | A1 | 9/2014 | Dusterhoft et al. | |
| 2014/0299315 | A1 | 10/2014 | Chuprakov et al. | |
| 2014/0334262 | A1 | 11/2014 | Brune | |
| 2015/0039234 | A1 | 2/2015 | Abou-Sayed et al. | |
| 2015/0075578 | A1 | 3/2015 | Kato et al. | |
| 2015/0075778 | A1 | 3/2015 | Walters et al. | |
| 2015/0134620 | A1 | 5/2015 | Crafton | |
| 2015/0355374 | A1 | 12/2015 | Morton et al. | |
| 2016/0010433 | A1 | 1/2016 | Kanstad et al. | |
| 2016/0010443 | A1 | 1/2016 | Xu | |
| 2016/0053611 | A1* | 2/2016 | Moos | E21B 43/263 |
| | | | | 166/250.1 |
| 2016/0139588 | A1 | 5/2016 | Huang | |
| 2017/0183963 | A1* | 6/2017 | Al-Dosary | E21B 47/07 |
| 2018/0203143 | A1* | 7/2018 | Hall | G01V 1/104 |

OTHER PUBLICATIONS

Cheng. et al. "Modeling of low-frequency Stoneley-wave propagation in an irregular borehole", Oct. 23, 1994, Paper presented at the 1994 SEG Annual Meeting, Los Angeles, California, Oct. 1994. (Year: 1994).*
International Search Report and Written Opinion, International Application No. PCT/US2017/047679 dated Nov. 29, 2017.
Canadian Office Action dated Jan. 31, 2020, for Canadian Patent Application No. 3,034,352.
Canadian Office Action dated Jan. 31, 2020, for Canadian Patent Application No. 3,034,219.
Australian Examination Report dated Nov. 14, 2019, for Australian Patent Application No. 2017327711.
Canadian Office Action dated Dec. 22, 2020, for Canadian Patent Application No. 3,034,352.
Canadian Office Action dated Dec. 22, 2020, for Canadian Patent Application No. 3,034,219.

* cited by examiner

METHOD FOR FRACTURE ACTIVITY MONITORING AND PRESSURE WAVE RESONANCE ANALYSES FOR ESTIMATING GEOPHYSICAL PARAMETERS OF HYDRAULIC FRACTURES USING FRACTURE WAVES

CROSS REFERENCE TO RELATED APPLICATIONS

Continuation of International Application No. PCT/US2017/047679 filed on Aug. 18, 2017. Priority is claimed from U.S. Provisional Application No. 62/376,465 filed on Aug. 18, 2016. Both the foregoing applications are incorporated herein by reference.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable.

BACKGROUND

This disclosure relates to the field of seismic analysis and hydraulic fracture as well as hydraulic fracturing process monitoring and evaluation. In particular, this monitoring can be in real time while hydraulic stimulation takes place, while additional analysis of the data can be in addition be performed at a later time.

This disclosure also relates to the field of seismic analysis of hydraulic fractures. More specifically, the disclosure relates to method for analyzing geophysical properties of hydraulic fracture by analysis of pressure waves and resonances.

In addition, this invention relates to monitoring fracturing activity in the wellbore, its changes, characteristics, and relevant operational characterizations for a formation stimulation process, such as hydraulic fracturing.

Hydraulic fracturing has recently accounted for a significant growth of unconventional (tight, shale) reservoir production in the United States. During hydraulic fracturing, fluid under high pressure is pumped into a low permeability reservoir to initiate fractures that tend to propagate based on dominant stress geometries and stress distribution in the reservoir. To maintain connectivity and potential fluid (reservoir hydrocarbons and trapped fluids) flow through the fractures created by the fluid under pressure, proppant is carried with the fracturing fluid. Proppant includes specific-sized sand or engineered (e.g. to withstand very high pressure) compounds such as ceramics, coated sands, and others. The proppant is injected along with the fracturing fluid (typically water and some chemicals that may include friction reducers, viscosifiers, gels, acid to help dissolve rock or wellbore debris, etc.). Even though simulations and rock physics/fraction propagation models have shed some light on fracture creation and growth, many parameters of and for successful/productive—in terms of ultimate hydrocarbon recovery from a well—fracturing in terms of ultimate hydrocarbon production and recovery have typically been determined experimentally and often by trial and error.

There are several ways known to create extensive and productive fracture networks in "stages" or sections moving from toe to heel (deepest point and the beginning of the horizontal section of a highly inclined or horizontal well), typically referred to as "plug and perf" and sliding sleeve (or similar) methods, that open only a small portion or section of the well or of perforations (openings) to the formation. Methods according to the present disclosure are applicable to plug and per as well as sliding sleeve methods because measurements take place during the pumping of fracturing fluid irrespective of the specific pumping method used.

Despite recent improvements in understanding production from unconventional fractured reservoirs, current monitoring methods and analysis, such as the passive or "microseismic" monitoring have been less than optimal in obtaining efficient fluid recovery. Additionally, many known microseismic or similar methods are time consuming, may require additional monitoring wells to be drilled, and typically are expensive because they including many surface sensors and an additional monitoring well to be drilled for some additional sensors. Moreover, determining the exact location of microseismic events is somewhat uncertain and may not correspond to actual rock volume connected to the wellbore.

It has been estimated that only a fraction of stages in a multiple stage fractured well contribute significantly to ultimate hydrocarbon production.

Moreover, fracture connectivity (related to permeability) and near well-bore fracture complexity (affecting efficient drainage) seem to show impact on ultimate recovery but are difficult to both infer and design with currently available methods.

The problem of efficient monitoring to optimize fracture treatment design has been approached in many different ways using microseismic and other forms of monitoring (electromagnetic, downhole measurements and logs, or, for example analysis using conductive or activated proppants). Such methods provide some level of information and detail, but have several drawbacks. Typical microseismic monitoring methods require many sensors, significant processing time and computing resources, and can be labor intensive. Moreover, many of these methods represent only an indirect measurement (i.e., where did the formation break) subject to having a well-known rock structures through which such waves propagate and various interpretations. In general, such methods can add significant cost, time and labor to the process. In particular, additional significant post-acquisition processing of acquired data to obtain results makes real-time information availability limited or impracticable Additionally, a practical method for monitoring a fracturing treatment should not only focus on monitoring the formation, but as importantly focus on monitoring the wellbore condition. Such monitoring offers ways to notice events (such as proppant accumulation before a screenout) that can have a major impact on the completion performance and costs.

U.S. Patent Application Publication No. 2013/0079935 A1 by Kabannik et al. describes a method using geophones and locates sensors inside a wellbore. The disclosed method does not require any downhole sensors, even though such implementation may enhance some results and is not limited to. Any downhole sensors are operationally difficult and increase costs of measurements. Moreover, the method disclosed in the '935 publication relies on more complex models and required interrupting fracture pumping operations. Furthermore, the first part of the disclosed method is not concerned with determining the location of microseismic events, only their detection.

A method for hydraulic impedance testing disclosed in Holzhausen, U.S. Pat. No. 4,802,144, where the focus is on free oscillations in the wellbore, not resonances within a fracture (network) and their signature being transferred into the wellbore, from where it can be detected. Moreover, the focus on relative and eventually absolute measurements is highlighted in the foregoing patent.

With reference to Patent Application Publication, US 2011/0272147 A1, by Beasley et al., the focus of Beasley and Bush was on sensors near reservoir but not necessarily sensors hydraulically connected to the reservoir which is the case of this disclosure (it does benefit slightly from additional ground-based sensors, but those are not required for effective operation). Whereas Beasley and Bush perform measurement before and post hydraulic fracturing/stimulation operation, the presented invention measures all parameters real time, continuously and while fracturing. Moreover, the method disclosed in the '147 publication may not be suitable for rapid interpretation.

U.S. Patent Application Publication No. 2012/0069707 A1 discloses using multiple receivers that are ground based, not connected hydraulically to the wellbore, while also requiring reference data and models.

U.S. Patent Application Publication No. 2014/0216729 by McKenna focuses on determining a fracture network volume using microseismic event triangulation and detection from surface based ground sensors, rather than from a direct fluid connectivity of wellbore fluid with the fracture network as the present invention.

U.S. Pat. Nos. 4,907,204 and 7,035,165 B2 are both based on active seismic well sources and well logging inside a wellbore, which uses wireline or similar devices or traverse a borehole and as such may be significantly more expensive and complex to implement in comparison with a single (or only a few) surface based borehole sensor(s).

DETAILED DESCRIPTION

Figure 1:
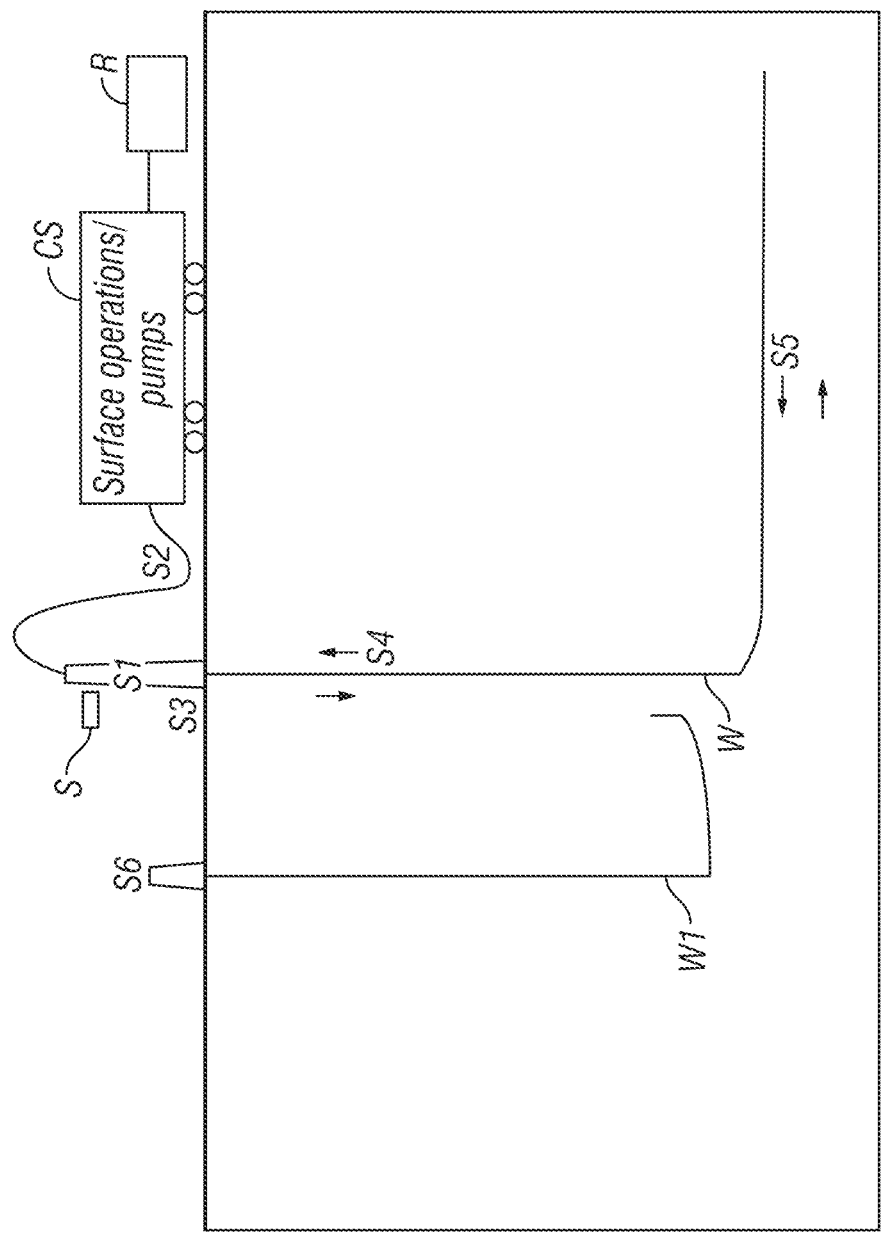
FIG. 1 shows an example embodiment of a data acquisition system that may be used in accordance with the present disclosure.

The description below uses specific examples but, the described examples are not necessarily the only intended or possible implementation or use of the disclosed methods. A person having skill in the art can devise other implementations to obtain similar purposes and results. Methods according to this disclosure make practical use of pressure waves and fracture waves, including their resonances, to determine hydraulic fracture and wellbore condition parameters. During hydraulic fracturing, formations crack or fracture, and fluid (in some instances with suspended proppant) is injected in the opened cracks or fractures. Because fractures may create an interconnected network, the terms "fracture" and "fracture network" may be used synonymously in the description below. Note that given the quantity of injected fluids, there is a geostatistical component and superposition to the sum of fracture sizes and distribution. Also note that methods according to this disclosure may be applicable to vertical, horizontal, or any other deviated well that undergoes hydraulic fracturing (stimulation) treatment in formation(s) penetrated by such well(s).

In this disclosure, active sources may be, for example, water hammer, fracture treatment pumps, etc. as described herein below. Continuous/passive sources are embedded in the operation itself and may include general fluid pumping energy (which may be spectrally analyzed), microseismic events, other geological phenomena not generally related to the fracturing operation (e.g., natural seismicity).

Fractures created during hydraulic fracture fluid pumping may be connected to the wellbore through casing perforations and, if existing, any previously created or naturally existing fracture network. Logically, only fractures, whether natural or man-made, that remain propped/open will contribute significantly to ultimate production of fluids from the well. Moreover, fracture connectivity and geometry have importance in ultimate recovery, well spacing design, well orientation, and even in-stage (within a single well) spacing or perforation designs and spacing. For example, stress shadowing from one fracture, perforation cluster, or fracture network can reduce recovery or propensity to fracture of another nearby stage, cluster, or adjacent well. Note that because methods according to the present disclosure rely on information traveling predominantly through the fluid and interfaces, such hydraulically connected volume is where the measurements according to this disclosure may be made.

A broadband or specific frequency excitation event to a fracture network, which may be but is not limited to natural geological activity, a pressure pulse in a well bore, microseismic events, or a significant rapid fluid flow rate change such as a water hammer (caused by rapid injection or release of a slug of fluid or a sudden flow) if broadband, of sufficient energy, or roughly the correct frequency spectrum will tend to excite a single or a set of fracture waves (often referred to as interface waves, such as Krauklis, Stoneley/Sholte waves). These fracture waves propagate in the formation fractures, can reflect back and forth within or along the fracture network(s) with relatively low attenuation, and thus can, especially with repeated excitation, create a set of one or more resonances within the fractures. These resonances contain information about the fracture geometry—to which they are bound—and petrophysical properties pertaining to the fracture wave propagation modes. Additionally, such waves will exist in an investigated (often the one being stimulated or a nearby) well and will transfer energy back and forth between the connected wellbore and the fractured formation.

A Krauklis wave, which is specific to a fluid bound by elastic media, is well scientifically established to propagate within a fracture as demonstrated in works of Korneev, Nakagawa, (Korneev 2011, Nakagawa 2016), and others. The artificial (and natural) fracture networks such as the ones created in an unconventional reservoir during hydraulic fracturing can support such Krauklis (or similar interface) waves. If Krauklis waves encounter a perforation that leads to a wellbore (or a similar feature), the waves can be converted into a pressure wave within the wellbore/tube and if the wellbore/tube is connected all the way to the surface (as most hydrocarbon producing wells are), such pressure wave would be propagated to and thus also be measurable on the wellhead surface top.

Resonating fracture waves may have low attenuation in fractures and as such can reflect back and forth along major fracture connections (while also generating secondary and tertiary harmonic resonances) forming a standing wave of well-defined frequency spectrum and amplitude even during hydraulic fracture treatment when changes in its dominant geometry change only at moderate speed. If such resonating fracture waves interact with a wellbore, a portion of the resonant energy would be converted to a pressure wave in the wellbore and eventually travel as a guided wave (typically as a Stoneley wave) to the surface where it can be measured and analyzed. The first order, as well as higher order resonances and signals can be analyzed to provide additional information concerning the fractures. The ability to analyze resonance signals and their higher order resonances will improve with signal to noise improvements (mostly better data analysis techniques, improved sensors and data acquisition, more accurate models), and as such the method will be able to provide increasingly higher details. Such a feature may be seen in autocorrelation of such measured signals.

A fracture network may be characterized as having three major dimensions (defined as length L, width W, and thickness h), where in general $L>W>>h$. In such cases the fundamental resonant frequencies are related to L and W and the phase velocity is related to h. Thus by measuring resonant frequencies in the fracture waves, one can infer the dominant L, W and h of a fracture or network. A simple estimate of connected/stimulated rock volume that is measurable with given sensitivity instruments can be calculated as a product of the three quantities (L, W, h). W, L may have lower resonance frequencies than h because their dimensions may be on the order of tens of meters, while h will be higher frequency because it is typically smaller than L or W. This principle is applicable to both naturally occurring and to induced fractures.

Continuously measuring pressure-related signals and also the rate of change or pressure (these can be pressure fluctuations, or rates of change in pressure such as provided by pressure gauges/transducers and/or hydrophones or microphones in gas-filled wells), how they change, their frequency characteristics, overall phase shift and time of travel, may be related to instantaneous fracture geometry. Comparing with theoretical speed of the waves given the proppant size (which puts a lower limit on a single fracture thickness), fracture geometry and other geophysical parameters can be determined.

Such computation would also include a model of the dominant energy and signal transport of tube waves as can be modeled according to Norris, 1990.

The quality factor (Q=resonant (maximum amplitude) frequency/resonance spectral width at half maximum amplitude frequency) of resonances may be estimated and used to infer the fluid communication of fracture networks to the well.

In an embodiment according to the present disclosure, sensors may be placed on the surface near, at, or contacting the fluid inside the well similar to that of FIG. 1. The sensors may include but are not limited to hydrophones that are connected to the wellbore fluid when pumping, other acoustic measurement sensors (to measure ambient noises), accelerometers, pressure transducers, jerk-meters (measure derivative of acceleration), geophones, microphones, or similar sensors. Other physical quantities can also be measured, such as temperature to provide temperature corrections and calibrations or for data consistency checks for all the sensors. Measuring nearby ambient surface noise using microphones, geophones, accelerometers or similar sensors can help in improving signal to noise in fluid pressure or pressure time derivative sensor data (i.e. pump noise as contrasted with fluid resonances due to fractures) by rejecting well-known and measured surface noises. Sensors measuring chemical composition and density of the pumped fluid may be used to improve analysis and are therefore implemented in some embodiments. An example arrangement of sensors and active sources is shown in FIG. 1. Sensors may be placed on and near a well W and in some embodiments on or near an adjacent well W1. Various sensor locations are shown at S1 through S6. Sensors at locations shown at S1, S2, S4, S5, and S6 may be exposed to fluid being pumped throughout a fracturing operation. A pressure source or seismic source S may be disposed at or near the position of sensor S1 and may be connected to the well W only when necessary to activate the source S. Sensor(s) shown at S3 may be seismic sensors disposed on the ground within about 100 meter(s) of the well W, depending on available access.

Sensor(s) S1 on the wellhead may measure, e.g., pressure, pressure time derivative, temperature. Sensor(s) S2 located near fracture treatment pumps may measure pressure, pressure time derivative, chemical composition, density, temperature, etc.).

More than one sensor on the wellhead (e.g., at S1) is not required, however additional sensors placed proximate the wellhead can provide higher accuracy, such as directionality of propagating signals, ambient noise records for noise cancelling, ground vibration measurements, steel casing vibrations, etc. and thus methods according to the present disclosure may benefit from using such sensors. For example measuring pressure directly near a hydrophone can help calibrate wave speeds as they are pressure-dependent. In some embodiments all the sensors should have substantial response in subsonic region (<20 Hz) as well as at ~1 kHz or above.

The signals from the sensors are amplified, filtered, captured (recorded and stored), digitized, and transferred to a computer or similar device for processing, e.g., in a recording unit R which may be disposed proximate the well W. Such recording unit R may be further connected with a control system CS of the entire fracturing operation to detect sensor measurements, analyze the measurements and provide possible feedback control loops to optimize operations and correlate multitude of data streams for final processing (pump rotation speeds, pumping rates, chemical input rates, blender rates, etc.).

Although data of primary interest can only be obtained in certain intervals of interest, a continuous stream of data acquired at reasonably high frequencies (up to approximately 100 kHz) may be beneficial for further analysis; a continuous or near continuous, or continuously pulsed measurement stream of data is desirable for microseismic event rate and fracturing rate monitoring. In particular, measurements of signals at relatively low frequencies (less than about 5 kHz) are important for both fracture characteristic analysis and wellbore condition characterization. Such frequencies provide some of the frequency domain information. Higher frequencies may provide higher spatial and time resolution into the fractures or wellbore features, and carry information of seismic and other subsurface events. The accurate recording of low frequencies is also important in order to detect large fractures and large stimulated reservoir volume-type features.

Such sensor attachments and connections may be made safely using common practices and design principles even though fracturing pressures are very high. Spacing of the sensors and available connections will be specific to a fracturing well-configuration, but in general a sensor should be connected very close to the formation (farther from the fracturing pumps). Exceptions may include secondary sensor(s), e.g., S2 located on the pumping flowline, that can be correlated with the measurements made by a sensor, e.g., at S1 to infer traveling wave linear directionality in the flowline and thus in the well.

More than one sensor is not required, as stated above, however additional sensors may provide higher accuracy, such as directionality of propagating signals, ambient noise records for noise cancelling, ground vibrations, steel casing vibrations, etc. Thus having more than one sensor is included in FIG. 1. Measurements from the various sensors may be time synchronized. One method of synchronizing sensors is using global positioning system (GPS) or global navigation signal system (GNSS) time signals detected at the sensors or by the recording system R (if the sensors are far apart). Combining all real-time sensor measurement streams into a single common data acquisition unit, e.g., the recording unit R could obtain the same results.

Sources of signals that excite and carry resonant frequencies in the fractures will come from, including but not limited to: pumping and pumping rate changes, wellbore characteristic changes, performing nearby casing or tubing perforations, nearby geologic activity, and surface or borehole-based time-limited/pulsed energy sources. In addition, continuous sources (valves, pumps such as are already used), or micro-seismic events, microseismic/fracture activity are broadband sources well-suited to excite such resonant frequencies. In particular, within reservoir-induced (by ongoing hydraulic fracturing operation in the well of interest or a nearby well while pumping) microseismic activity, is important in generating some the fracture waves and related signals.

Figure 2:
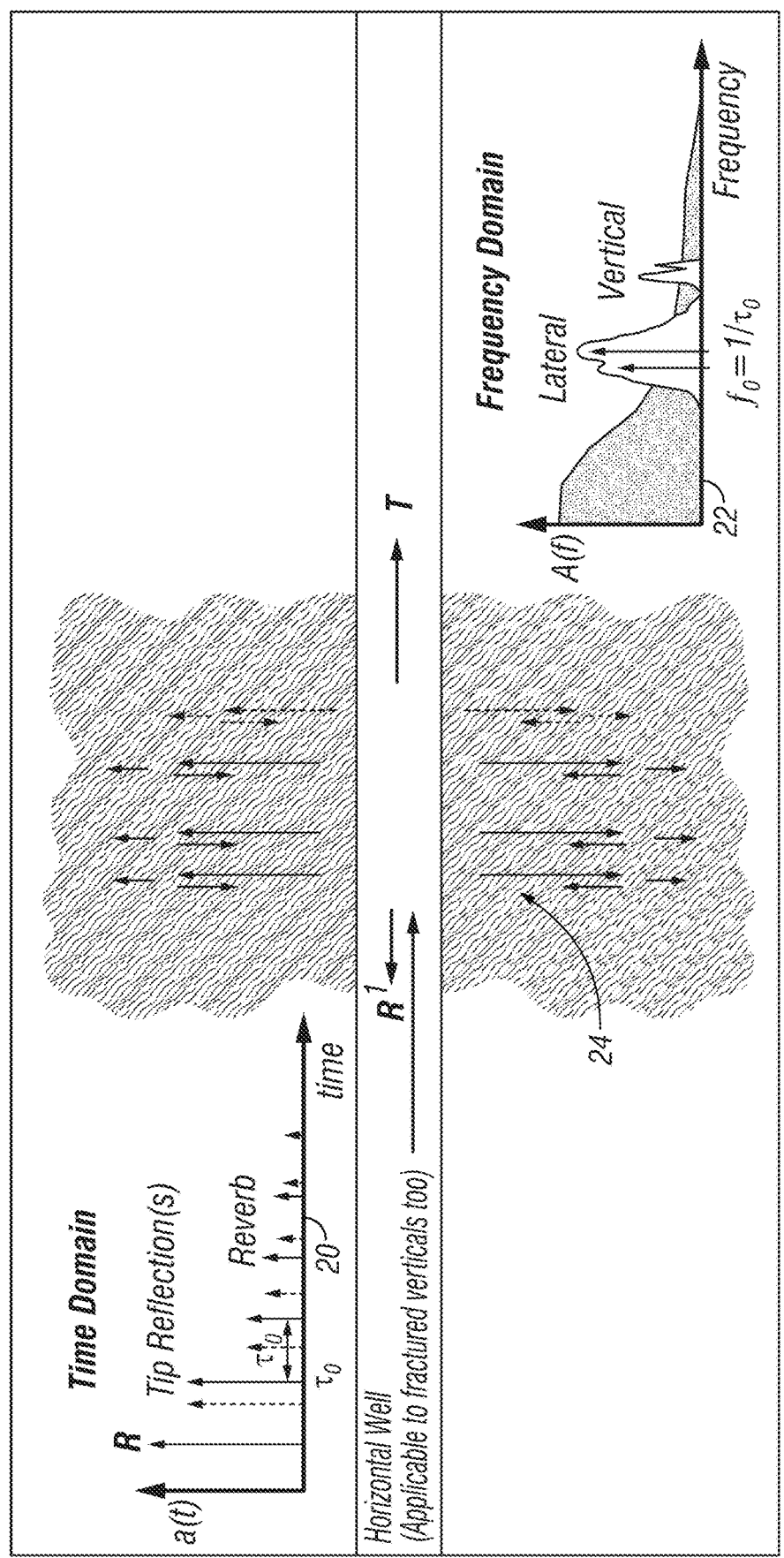
FIG. 2 shows an example geophysical model of subsurface formations being fractured and measurements made according to the disclosure to characterize the fractures. It also shows the resonances driven in fractures through pumping and microseismic activity.

FIG. 2 shows an example geophysical model of the well traversing a subsurface formation, fractures 24 created by or enhanced by fracture treatment pumping, measurements obtained using a method according to the present disclosure and analysis of the measurements. Traveling fluid pressure waves are shown schematically at R1 in the graph at 20 being reflected pressure wave in the wellbore, and T representing transmitted pressure waves in the wellbore. FIG. 2 shows graphic representations of the transmitted pressure wave T with respect to time superimposed on the reflected pressure wave R1 and its reverberations on the graph at 20. Frequency domain analysis is shown schematically on the graph at 22.

Figure 3:
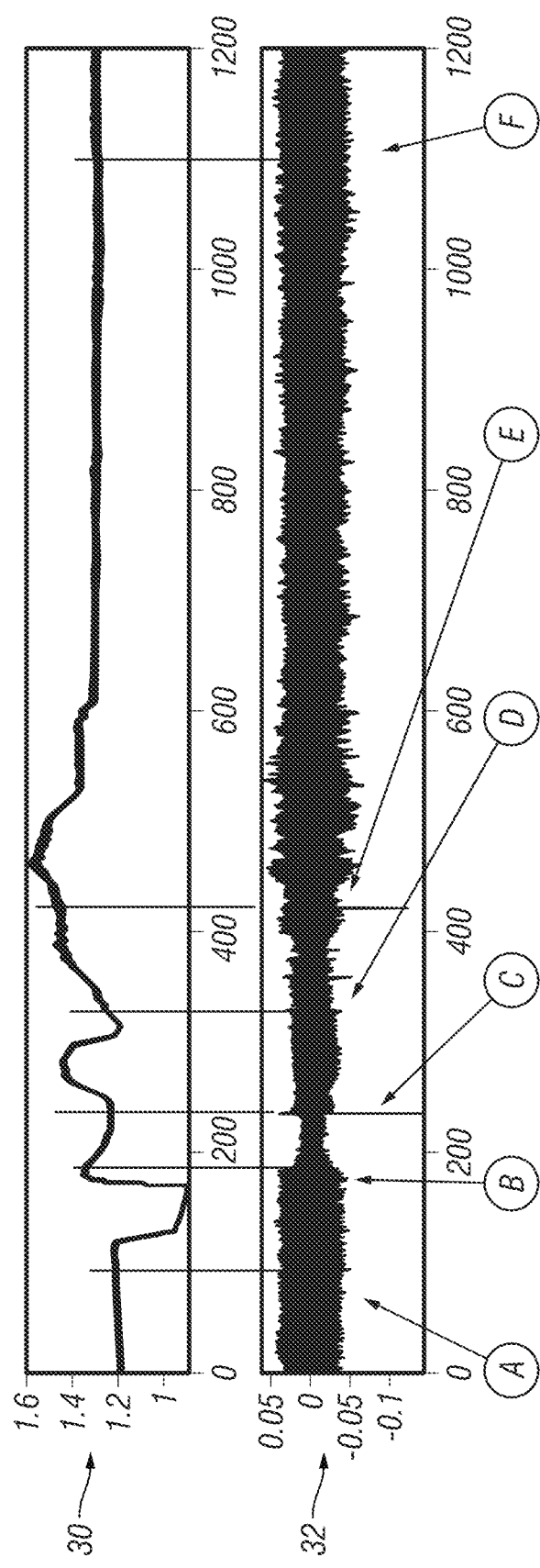
FIG. 3 shows an example of data recording and analysis. The top frame shows pressure at a selected position in or along a well (arbitrary units), the middle frame shows hydrophone or acoustic pressure change (time derivative) data, the bottom frame shows examples of characteristic times and events.
Figure 3:
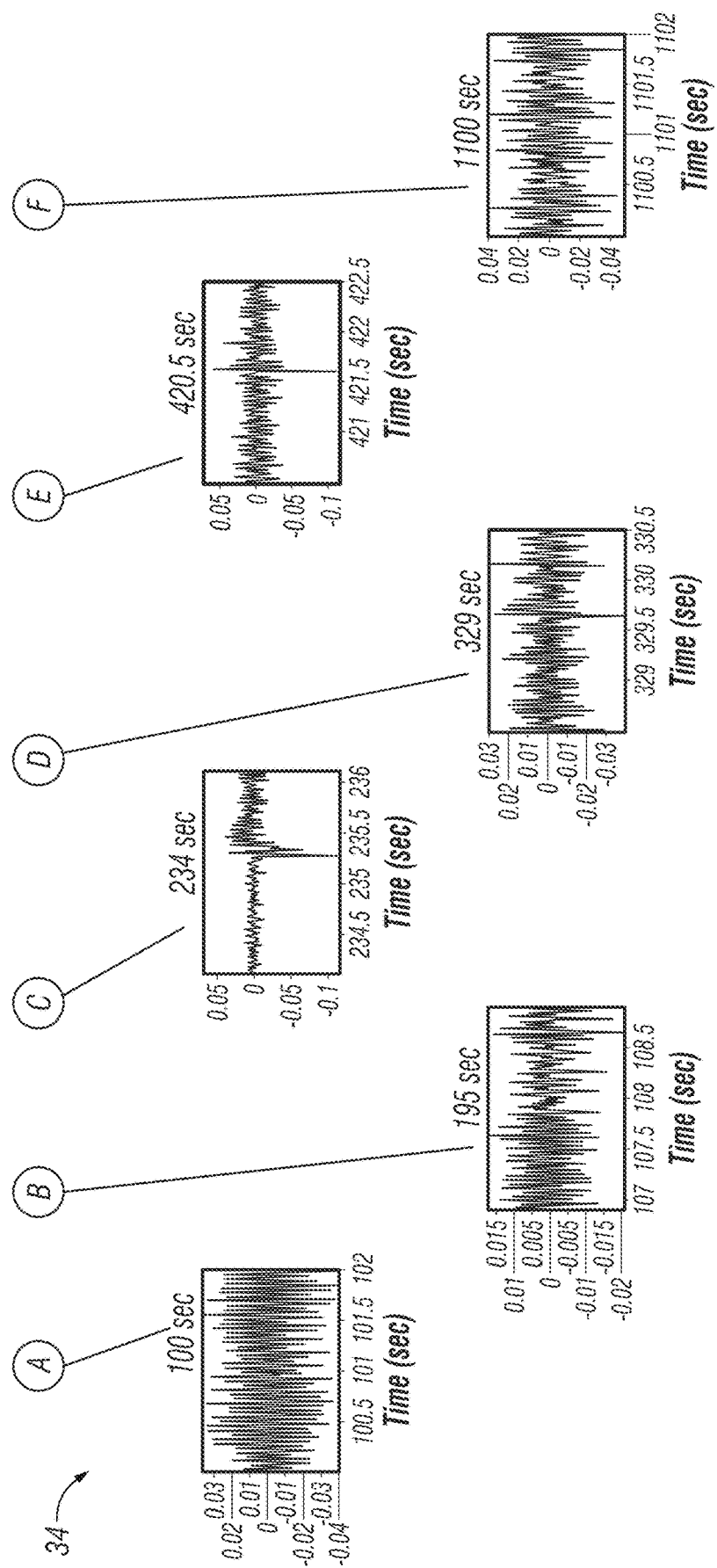

Measurements acquired during a fracture treatment pumping stage may be similar in characteristics to what is shown in FIG. 3. Note that a rapid pressure change generates an acoustic signal (can be subsonic <20 Hz, or supersonic >20 kHz) and often may be referred to as such.

The upper frame 30 in FIG. 3 shows pressure applied to a well with respect to time as measured, e.g., at sensor S1 in FIG. 1. The middle frame 32 shows a graph of the time derivative of the measured pressure (from another sensor). The lower frames 34 show graphs of the time derivative of the measured pressure with reference to specific events occurring in the well (e.g., as shown at A through E) and in the formations penetrated by the well. During a common hydraulic fracturing operation, a ball-seating plug is set at a selected depth in the well, then a sealing ball is pumped down the well at a modest rate (few tens of barrels per minute, e.g., 100 seconds in the upper frame 30), slowing down before the ball engages a plug (e.g., at 195 seconds in FIG. 3). Immediately after the ball seats, at which point if chosen, properly used and spotted, acid would reach the area of perforations in the well casing and the formation. At 200 seconds in FIG. 3, the pressure rises to the point where fractures in the newly pressured fracture treatment stage start to open. A steep pressure increase shown in the upper frame 30 indicates that the present fracture treatment stage is hydraulically isolated from the previous fracture treatment stage.

As more fracturing fluid is pumped and the fluid pumping rate increases, fractures continue propagating in the formation. Fracture treatment service operators typically increase the rate of pumping until a target rate is reached (in some cases 100 barrels per minute or more), which also increases the fluid pressure. Once a target planned "sweet spot" or optimized fracture fluid pumping rate is obtained, the fracture treatment service operator may maintain that pumping rate unless unexpected behavior (pump failures, screen-out, or unexpected pressure rise) and safety considerations or feedback from methods as disclosed herein require otherwise. For example, pressure and pumping rate can be changed to overcome friction and to mitigate growth of fractures. During this time, proppant may be added to the pumped fluid to keep fractures open after the pressure on the fracturing fluid is relieved.

Figure 8:
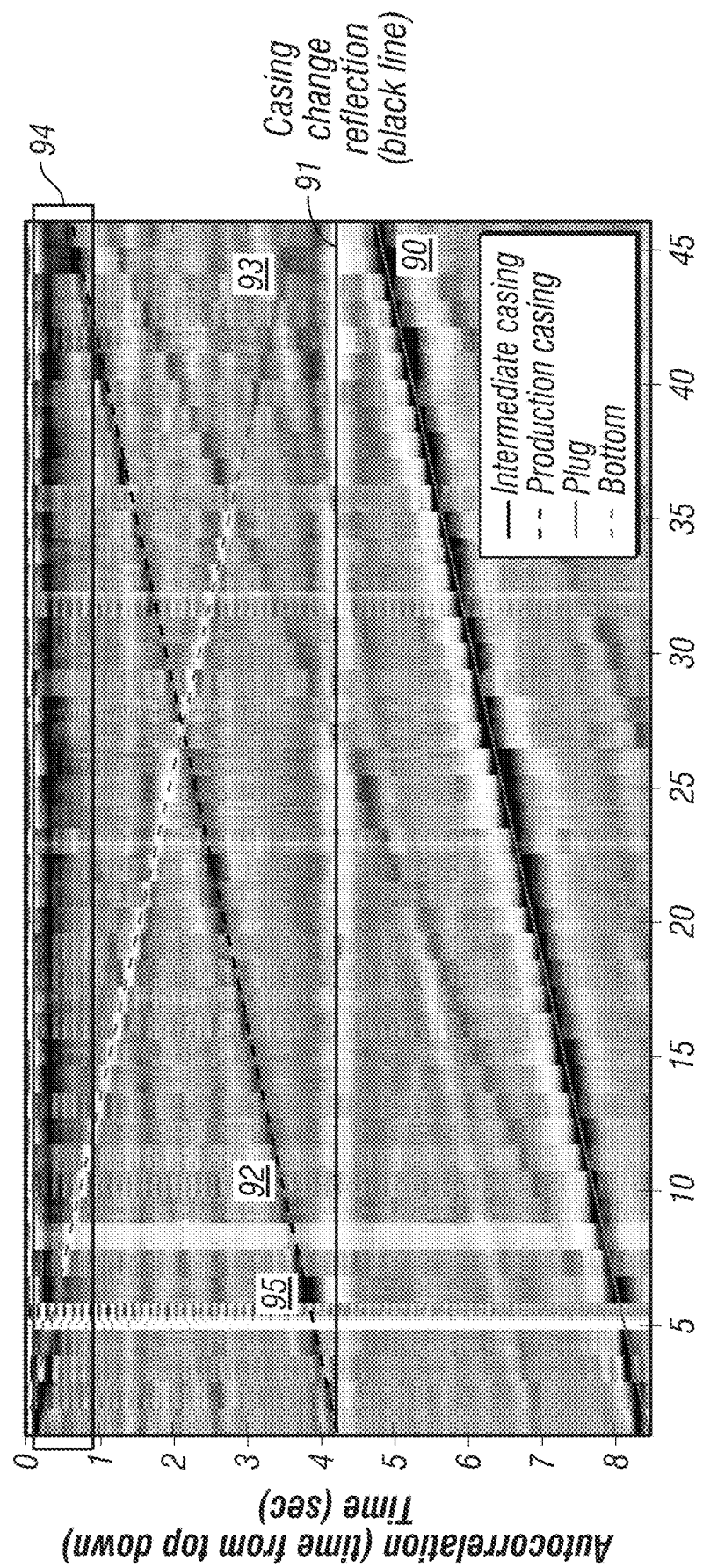
FIG. 8 shows an autocorrelation function across various stages and points out the changing, unchanging physical features as well as an area where fracture waves can be observed.

In FIG. 3, note in the lower frame 34 measurements corresponding to pump noise, pressure changes with ball seating, a microseismic event identified around 420.5 seconds and a stabilized pumping noise and pressure signals during this time are detected. Measuring, detecting, and providing real-time feedback related to the microseismic events thus detected may also be valuable. In simple form determining how many formation-breaking events, i.e., microseismic events, occur per unit time may show how much the formation has been fractured and can be combined with additional information (such as but not limited to fully passive microseismic analysis) for even more comprehensive understanding. Real-time aspects of the pressure and pressure time derivative measurements can be useful as the operator may want to maintain a certain formation-breaking/fracture creating rate (microseismic events per unit time interval) to optimize fracture creation for maximum hydrocarbon recovery. Thus a real-time identification and ongoing analysis as may be implemented in a computer system is shown in FIG. 8.

Time-frequency analysis may be used to show change of the pressure wave spectrum over time. Frequency domain analysis, such as may be provided by a Fourier transform can then have a better resolution in the time-frequency stationary period.

In some embodiments, measurements from a plurality of sensors such as shown in FIG. 1 comprising pressure transducers, accelerometers, or geophones may be used to reduce surface-based noise, reconfirm the existence of strong events, and/or to eliminate certain frequencies in the signals such as those originating from the pumps or surface activity instead of the reservoir and/or fractures or subsurface signals carried though the wellbore.

After noise reduction and improving signal to noise ratio of the pressure and/or pressure time derivative measurements, frequency domain techniques may be applied to a single set of measurements or a plurality of sets of measurements. The frequency spectrum of the pressure or pressure time derivative sensor (e.g., hydrophone) measurements may change with changers in subsurface reservoir properties over time. Pumping rate and other physical variables during fracturing (density, temperature, pressure, chemicals injected, proppant concentration, proppant size, etc.) will all also vary the result. Peak amplitude picking and general structure of the spectrum of the measured signals may be used to identify the time period within a fracturing stage related to initial pumping of a plug-ball, initial formation fracture opening, microseismic events generating tube waves and other pressure disturbances, changes in pumping rate, and pump shutoff that generates a strong water hammer signal (FIG. 3, at 93 seconds) which may propagate up and down the wellbore for many seconds.

Figure 4A:
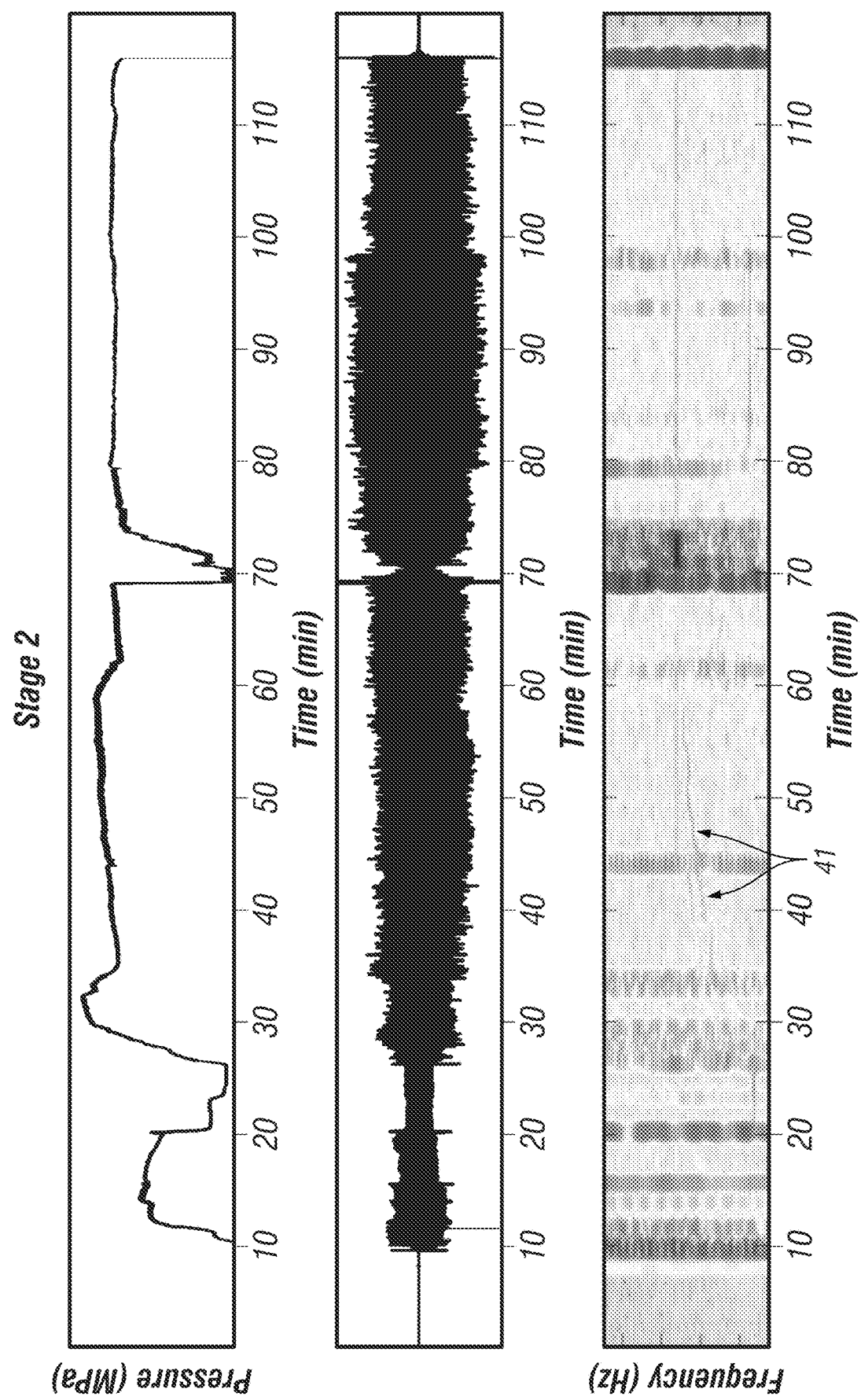
FIG. 4A shows pressure, sensor, and resonant structures for a stage.
Figure 4B:
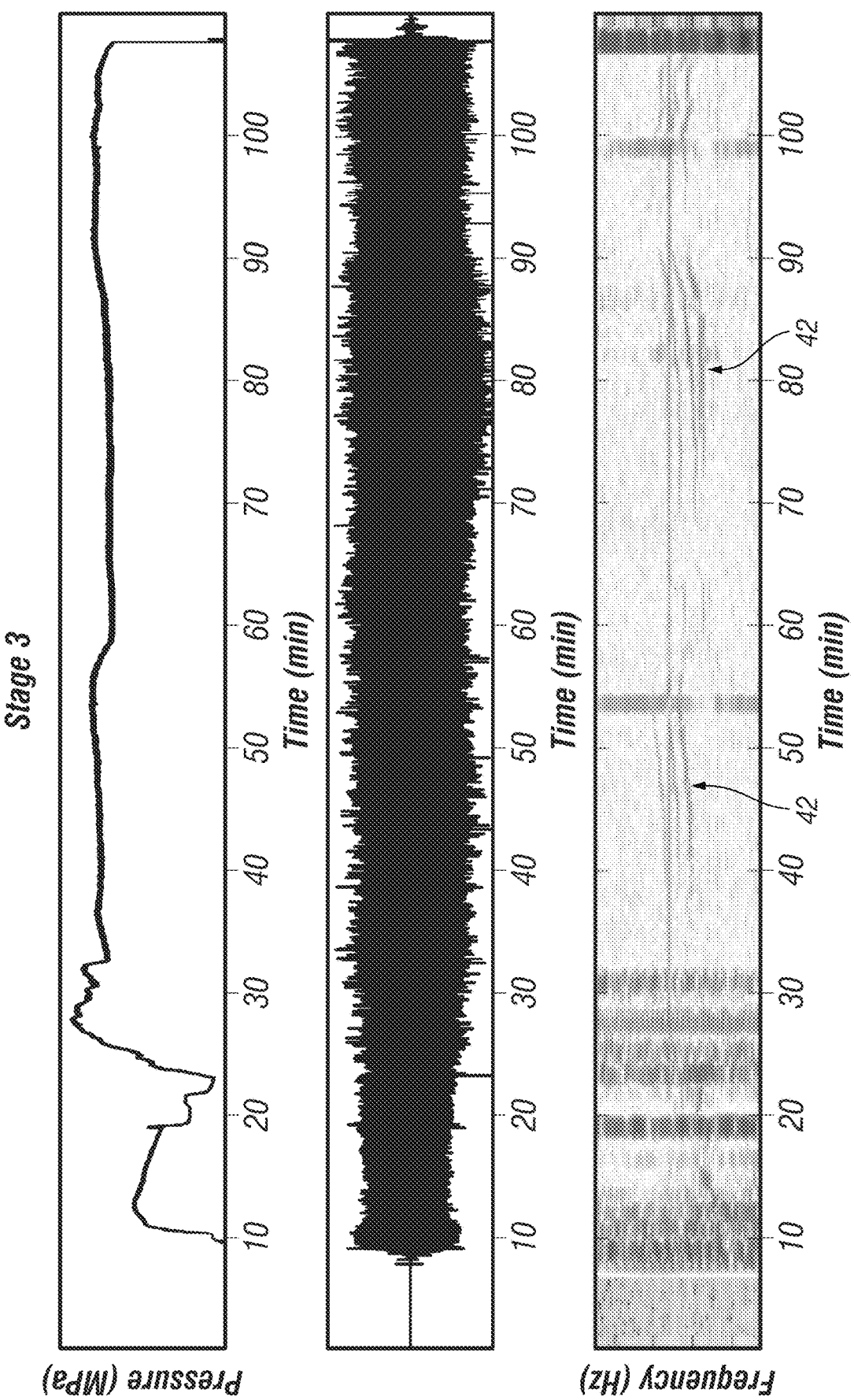
FIG. 4B shows pressure, sensor, and resonant structures for a stage following the one in FIG. 4A.
Figure 4C:
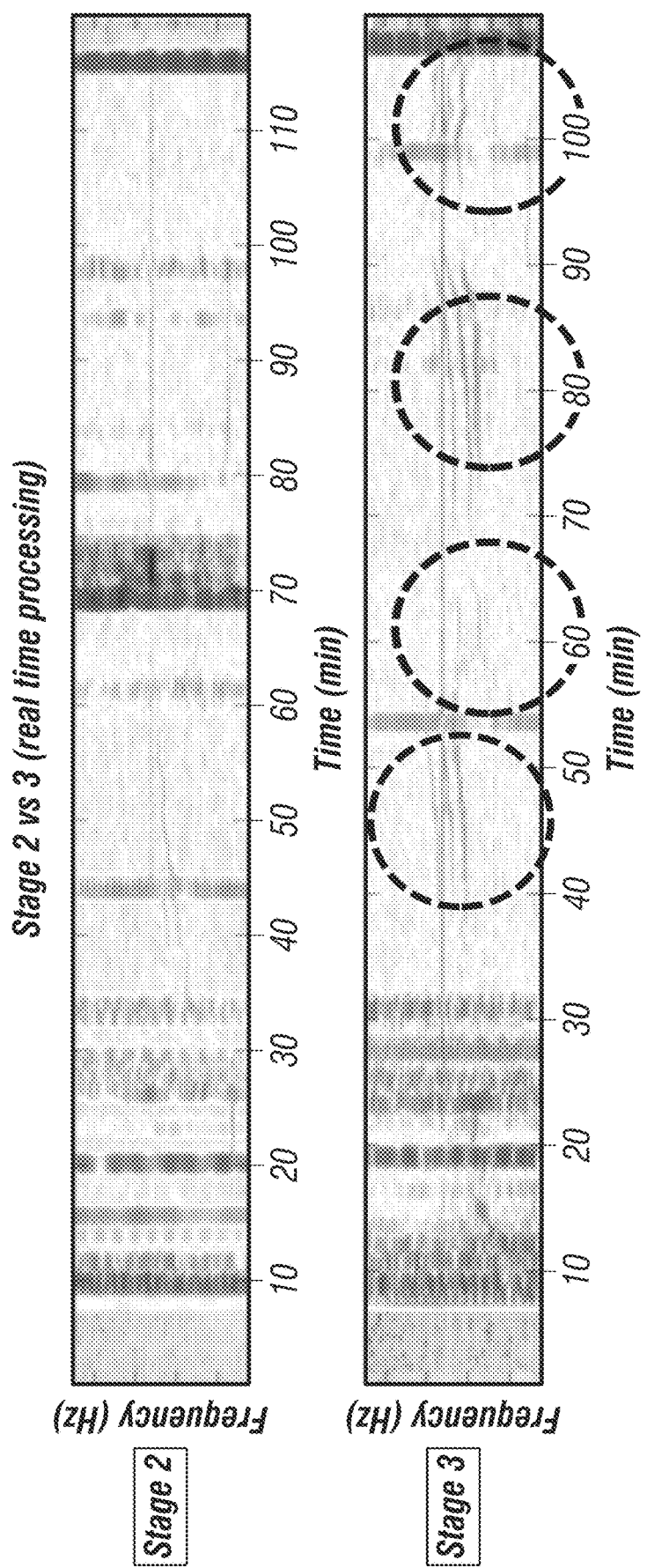
FIG. 4C shows resonant structures related to formation fractures for the prior two consecutive stages on a same well.

Example frequency domain analysis of pressure measurements made through pumping a fracture treatment stage may be similar to what is shown in FIGS. 4A, 4B and 4C. These resonant structures (e.g. 41, 42) are related to formation fractures for the two consecutive stages on a same well. The figure demonstrates how the resonant structures vary and evolve over time. A marked difference is highlighted by dashed circles between stages 2 and 3 in FIG. 4C. Higher branching would indicate larger fracture complexity. Fracture network resonances change spectral content as their geometry changes, unlike other types of resonances (pump resonances shown by arrows in FIG. 6.) and casing resonances (full fluid-system resonance in the well) in that those do not change substantially over time.

Within a single resonant mode, a wider resonance peak (lower quality factor) would indicate many fractures and thus relatively higher complexity as energy is dispersed among the many fractures. Conversely, a narrower resonance peak or a set of higher amplitude, narrower resonance peaks would indicate a more simple network, dominated by several, less-complex, and less-connected fractures. Thus a fracture density or complexity/tortuosity can be estimated from any given resonance peak.

In general, dominant resonant frequencies may be related to the fracture dimensions and their order can also be determined. Parameters of the resonance peaks (central frequency, peak amplitude, and peak spectral width) can then be used to determine petrophysical properties and fracture geometries through more complex dispersion relation and wave equation approximately as the following:

The peak central frequency can be related to distance (L or W) dimensions of the fractures and dispersion relationship.

The peak frequency amplitude can be related to the number of fractures having the same L or W-dimension.

The spectral width of the resonance can be related to viscosity of fluid, formation fracture connectedness (related to permeability, the product of viscosity and permeability), i.e., fluid mobility and other characteristics of fluid in the fractured formation. A standing wave model, combined with the wave equation, a permeability or connectivity model, fluid and elastic layer properties with the spectral content of the resonance energy, can provide more accurate results. Note that there would be some drift over time as the fluid in the dynamic system while pumping is not static: fractures will continue to grow and propagate as pumping of fracture fluid goes on, or a s pressure might drift, affecting wave speeds.

Because pressure transients in the well propagate as Stoneley waves, they are sensitive to diameter (blockage) changes, casing cement or material changes of the components in the wellbore. Thus, unexpected blockages, or even screen-outs (where large quantity of sand blocks the flow of pumped fracturing fluid) can be detected and their location estimated based on the characteristics of pressure wave reflections in the well in addition to changes in measured resonant structures. Similarly, the bottom of the plug is defined by the fixed plug, and a location of a misplaced plug can thus be also determined using a pressure pulse or an "active" source. Additionally, polarity of the wave reflection determines the fixed (plug) or quasi-static end of a fracture (fracture tip).

1. Fracture Activity Monitoring

Using fluid/well-bore microseismic detection and event count (as shown in FIG. 3) from the surface sensor, rates, relative comparison stage to stage, time-to-time, absolute count, etc.) of microseismic activity can be determined. Some amplitude information can be also inferred indicating how "strong" or how (those are tangled) far a microseismic event took place. This method uses pattern recognition and a threshold of the "blips" of microseismic events—they have a typical signature in the data as shown in FIG. 3C and there are many of them. Tuning onto this type of event and processing real-time, one can get an instantaneous fracture-making/rock-breaking rate. This rate, for a given reservoir formation, can be related to fracture network effectiveness and ultimately to production. A feedback system, for example, but not limited to an instrument similar to a beeping Geiger counter, can be built to vary fracture treatment parameters in real time to achieve a certain "popping" rate, or an acoustic/display of the rate can be used to adjust those parameters manually. Those skilled in the art will appreciate that sophisticated processing software for detecting and analyzing microearthquakes in real-time from passive seismic signals.

2. Fracture Dimension

Fracture dimensions of a given fracture treatment stage can be determined. Even though some physical quantities may be somewhat uncertain (e.g., fracture-wave velocity) to enable determining absolute and exact dimensions, relative stage to stage comparisons can be made that may be relatable to future expected fluid (hydrocarbon) production. Again, related fracture surface and volume can be determined from the resonances and fracture mouth reflectivity.

Predominantly determined from the resonances, their frequency, and harmonics, relative (stage-to-stage) information may be obtained using active source and mouth reflectivity analysis. Pumps can be used as an active source without having to have an active source on the surface. Eventually, such relative information may be calibrated.

Figure 5:
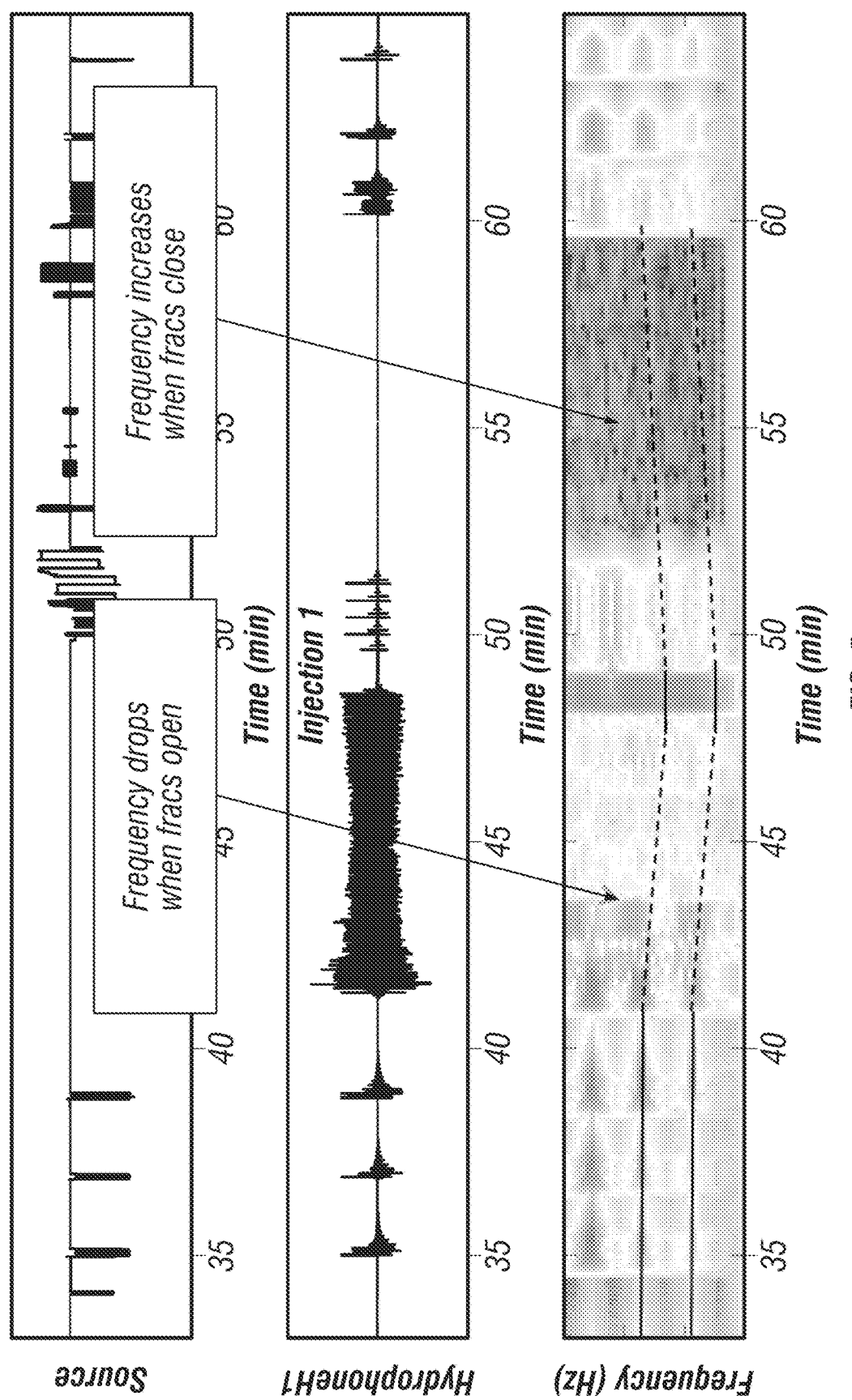
FIG. 5 shows a measurement and observation of fractures opening and closing during an injection test. The figure shows the trailing resonance and its change as fractures open due to injection and close after the injection completes.

During a diagnostic fracture injection testing (DFIT), liquid with no proppant is injected into a formation. Because it lacks proppant, there is a tendency of the fractures to close and fluid to leak off. The dashed line in FIG. 5. shows how resonance frequency changes during one such test. Pumping started around minute 42, stopped around minute 48, and formation relaxation happened from thereon. This presents an example of frequency shift due to the creating of a new fracture network (up to minute 48) followed by closure. Importantly, because proppant is lacking, the fractures will close and resonant frequency returns to the initial value after minute 60.

3. Fracture Surface/Volume

Fracture surface will be related to a product of L*W, volume will be related to L, W and h. Fracture tip reflections can be extrapolated from L and W as well as from the longest/farthest travel reflections.

4. Adjacent Well Fracture Effects

A pressure wave propagating through a fracture network originating at an actively fractured well that crosses a nearby wellbore path or a nearby fracture network of another well can propagate energy (for example through fracture waves) and excite pressure waves in the other well. Monitoring the pressure and its changes in the other well can indicate cross-well permeability and the extent of the first well fracture network. Knowing this extent, an operator may choose to adjust the ongoing or any future fracture stage parameters to avoid such cross-well fluid connectivity.

5. Fracture Waves

Figure 7:
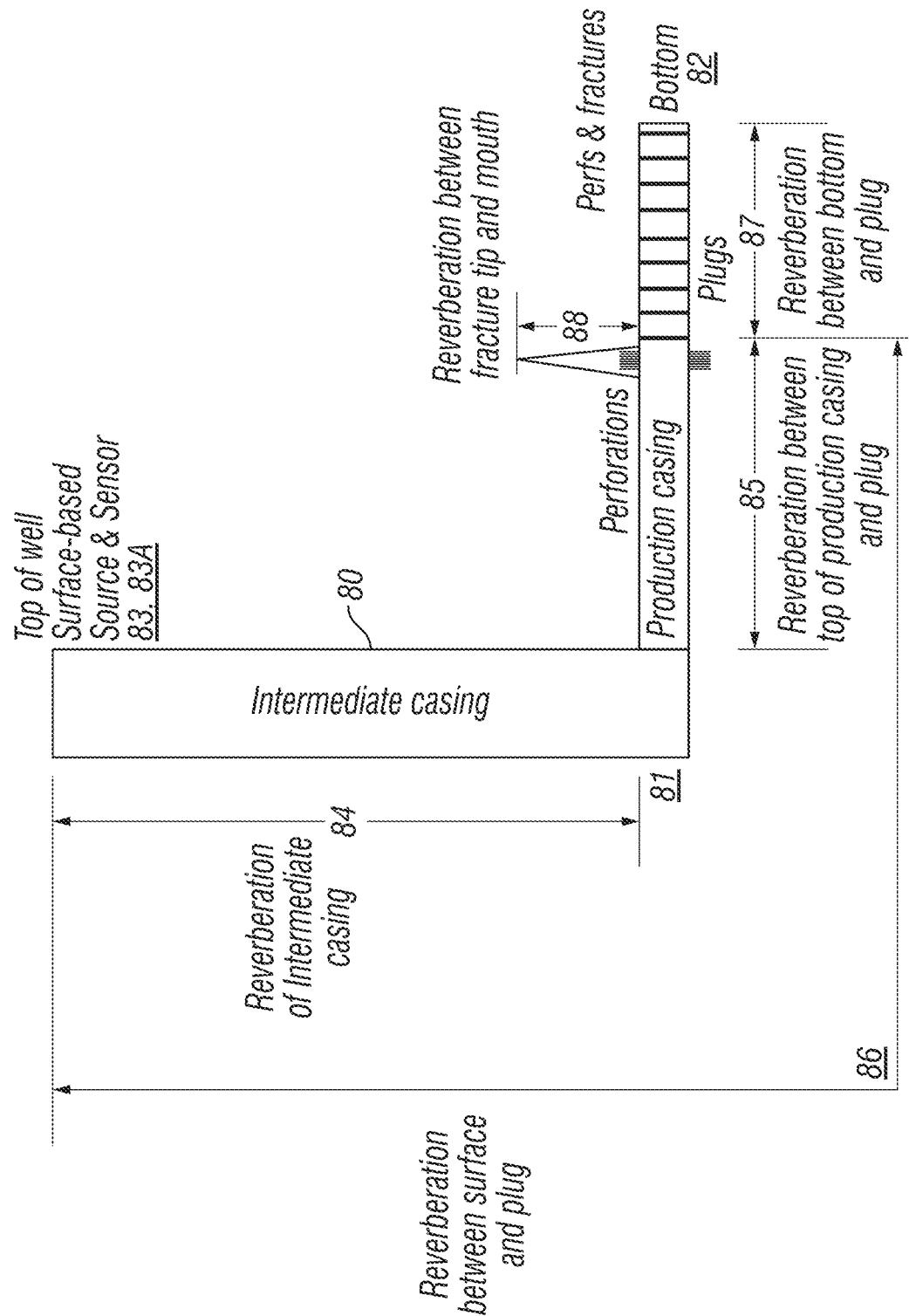
FIG. 7 shows a sketch with most relevant reflection features of the wellbore in following figure (FIG. 8).

In a typical (plug and perf) horizontal well shown in FIG. 7, within the borehole, 80, there are several pressure (tube) wave reflection points. Examples of such points include a change in the casing diameter between intermediate and production casing 81 and the reflection of a plug and any plugs beyond the wellbore bottom 82. Sensors placed on the surface 83 record signals, reflections, and resonances. Proximately placed source 83A can excite such resonances. Several reverberations are highlighted: intermediate casing 84, production casing 85, surface to plug 86, bottom and plugs 87, and between fracture tip and mouth 88.

Discontinuities within the borehole-fracture system can result in reflections and reverberations which can be recorded by the sensor at well head in the form of tube waves. Autocorrelation is an efficient DSP algorithm to detect the reverberations in a signal. An autocorrelation image of multiple fracture stages helps understand and identify the physical features of these events and their variation over time. Examples of identified events include: (1) Reverberation between well head and plug, fracture tip mouth, (2) Reverberation of intermediate casing, (3) Reverberation between top of production casing and plug (4) Reverberation between plug and bottom of borehole, (5) Possible fracture wave reverberation between fracture mouth and tip. The properties of these detected events can be used to diagnose the fracture treatment and the fracture network.

FIG. 8 depicts autocorrelation function per stage. FIG. 8 demonstrates reflections in the data across many stages as the plug progressively moves from the bottom (toe) of the well to the heel of the well. Unchanging casing diameter change reflection (line 91), topmost plug (line 90), production casing (line 92), and wellbore bottom (93)—all straight lines are noted. Fracture waves rectangular region (94) is highlighted in low time value of autocorrelation (corresponding to higher frequencies). Other anomalies showing irregularities between stages can be also observed 95).

6. Additional Embodiments

Fracture tip growth rate(s) measurements may be obtained using a directional wave traveling back and forth between the surface and the fracture tip. Such measurements can use an "active" source such as water hammer, or some active sources already embedded in the fracturing operation, such as the fracture treatment pumps themselves.

Fracture network structure may be inferred from fracture network resonances. Dispersion and attenuation of resonances can be related to near well-bore permeability using this method. Reflection coefficient measurements can expand on the model to identify other physical features (mouth of fracture, etc.). This may be an indirect inference of permeability or frequency-dependent permeability product. Width of the resonance can be related to viscosity of fluid, permeability and other characteristics of fluid formation. The proppant dependent diffusivity and time varying rate thereof can be estimated via time varying rate by taking repeated temporally separated measurements.) Estimate of total number of similar fractures can be performed using geostatistical enumeration. In general, the strength of the resonances will identify number of similar large fractures (stronger resonances of a given frequency).

Figure 9:
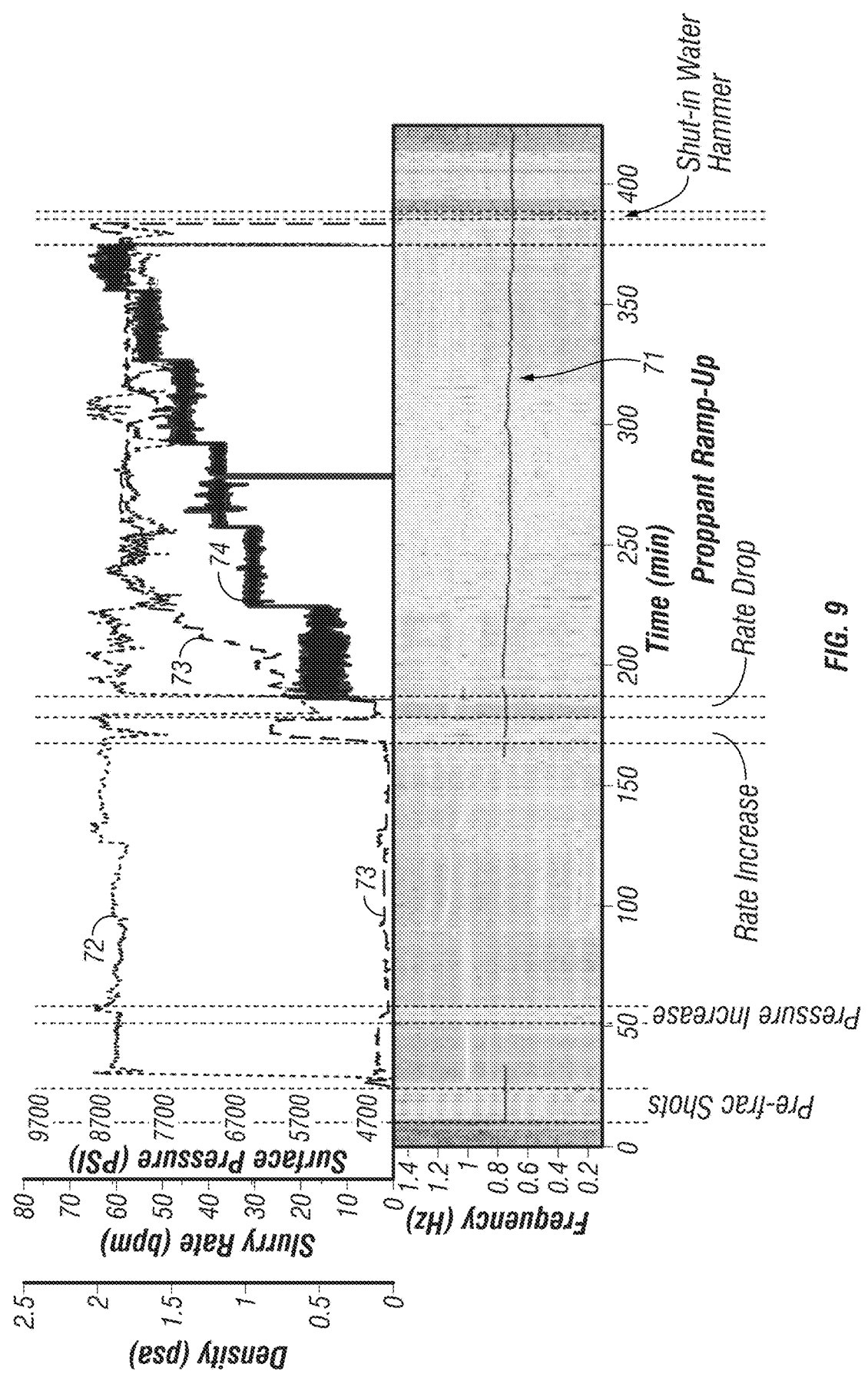
FIG. 9 shows wellbore condition and fracturing activity monitoring by aligning the pumping data with spectrogram of a surface hydrophone sensor. Small changes in a dominant frequency around 0.8 Hz—which is a mode of the wellbore resonance—are shown, some correspond to operational parameter changes, and contemporaneous wellbore condition in general.

Wellbore condition may be monitored as shown in FIG. 9. The spectrogram of the sensor data (in this case only a small portion of the full spectrum up to 100 s of Hz is shown) is in the lower portion of FIG. 9 to demonstrate. An overlay of pumping parameters and real-time monitoring of their changes along with a spectral chart of pressure and/or pressure time derivative (hydrophone) data may identify various events of interest. Only surface/pumping pressure (72), slurry rate (73) in bpm, and proppant density concentration in pounds of sand per gallon (74) are displayed. Other parameters may be also included, although these three in particular (72, 73, 74) instantaneous parameters may have an immediate effect on resonances. Some additional relevant parameters that may be used are bottom hole (at perforations) sand concentration, bottom hole pressure and acid concentration, among others.

The particular low frequency (~0.73 Hz) followed through the completions procedure by a line 71 in the bottom of FIG. 9 is one of the wellbore resonance modes, but other modes corresponding to various structures and features (at differing frequencies) can be identified, simultaneously monitored and analyzed.

Estimated fracture (network) closure time(s) and rate(s) can be determined by making delayed time measurements of an active energy source during or past the fracturing completion and before a plug for next fracture stage is set.

Estimated location(s) of blocks, screen-outs, or other induced wellbore changes may be made using an active pulse or changes in resonant structures in the data (such as in FIGS. 6, 9) over time that do not readily correlate with operational changes on the surface. An artificial intelligence learning algorithm, such as an artificial neural network, may be implemented in a computer or computer system (FIG. 10) on larger data sets to predict screen-outs, equipment breakdowns, fracture complexity/tortuosity, and other parameters.

Tube waves/Stoneley waves traveling through the wellbore reflect from well diameter and casing weight changes, as well as surface imperfections in the wellbore, such as perforations. Any blockage will also be visible as the dominant reflection time will change. One example is a reflection from a plug; as the fracturing stages progress from the toe (deepest extent) of a horizontal well to the heel (beginning of the horizontal portion of the well), tube wave and water hammer reflection times become shorter and shorter. Having known (or well-approximated) pressure, temperature, casing sizes and fluid composition, a fluid tube wave velocity can be determined according to Norris 1990. In addition, this fluid tube wave velocity can be calibrated and compared with velocity measured by distance to known casing changes, or by known plug-surface distance combined with acoustic wave travel times.

One can use comparative techniques, including but not limited to tabulations, averages, deviations, parallels displays, other means of automated or manual processing, and similar to compare the parameters/fracture and any fracture characteristics stage to stage and well to well, or stage on a first well to a corresponding stage on a second well for additional analysis and insights to optimize hydraulic fracturing designs and hydrocarbon recoveries.

Figure 6:
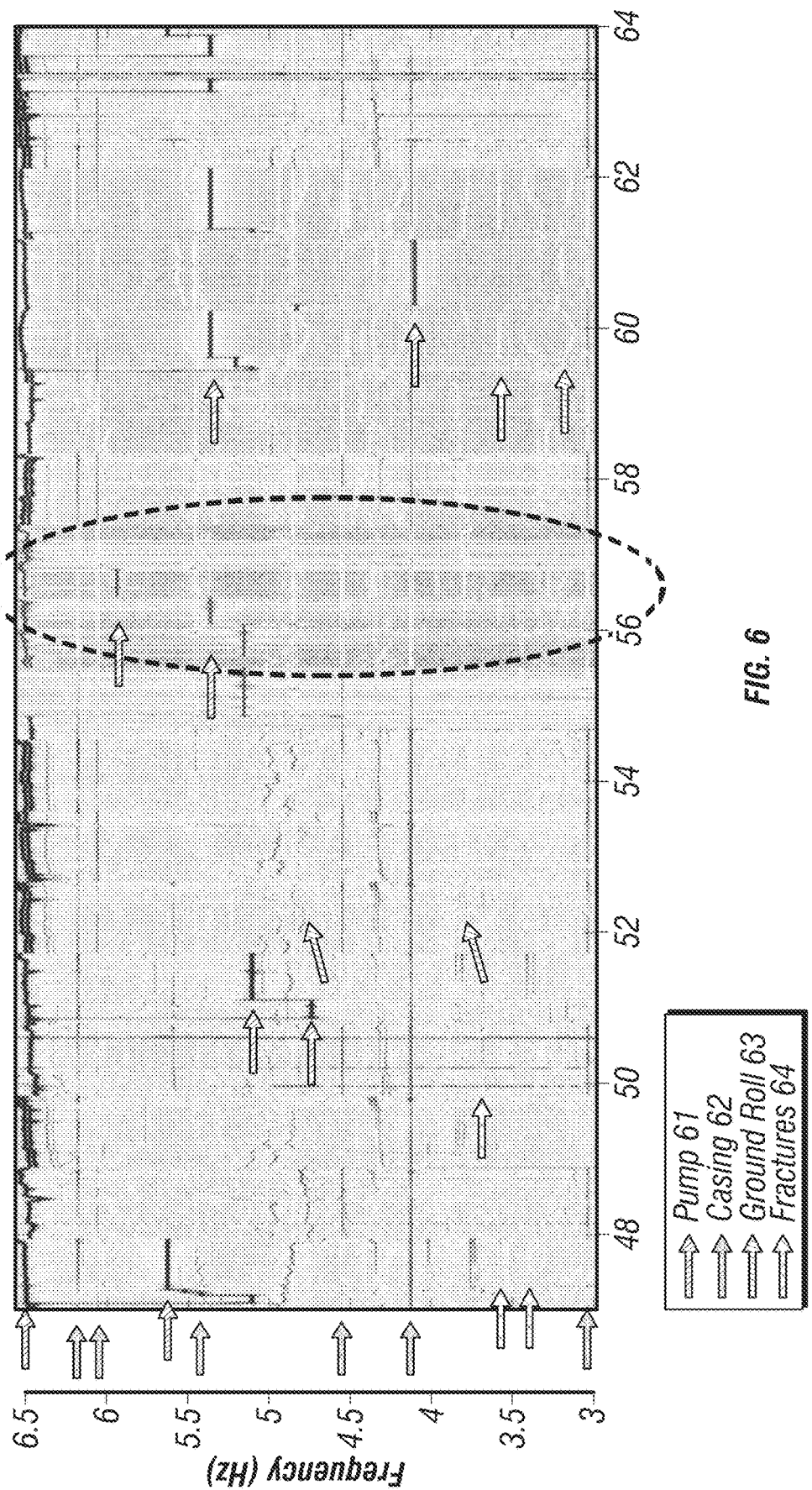
FIG. 6 shows resonance identification of various events and sources. Several of the resonances related to fracture treatment are highlighted by the cross-hatched arrows 64. Also note a much lower intensity in stage 55 and 56, indicating a less-noisy, lower fracturing activity/event stages. A clear a comparison of fracture activity, microseismic background, and microseismic-induced resonances among several horizontal stimulation (fracturing) stages can be made in this figure.

FIG. 6 shows a comparison of activity and microseismic among several horizontal stimulation (fracturing) stages as well as point out several regions of interest. The figure compresses in time only the stimulation (pumping) portions of the treatment next to each other and omits the inactive wireline run and perforating times. Note that the pump resonances are very strong and only minimally change frequency across stages, while, e.g. region in horizontal oval changes depending on dominant fracture geometries and their progress through pumping. A pump signature 61, casing resonances 62, and ground roll 63 can be distinguished from a fracture resonance signature 64. Also note the vertical oval indicating relatively low microseismic and noise activity; one would expect that such lower activity would mean lesser fracture complexity, potentially indicating that another, more permeable zone was encountered in those particular stages. Similar lower (but not as low) intensity fracturing occurs again in stages 59 through 62. A comparison of activity can distinguish a stage with more rock fractures and fewer fractures during fracturing, which is relatable to estimated ultimate production. Any of the types of resonances can be monitored in real-time and tracked as their frequency changes to indicate variations in wellbore or surface 61, 62, 63 and the treated formation. This is demonstrated more clearly in FIG. 9.

It should be noted that for measured resonances while fracturing operation takes place that the resonances observed in the data combine and represent the entire hydraulically-connected system of the wellbore (including some surface piping features) and the fracture network of interest. At any given time or at equilibrium, only those fractures that are still open (e.g. contain proppant) are hydraulically connected to the wellbore and will be measured. The resonances of the wellbore will, depending on the wellbore length, fall in the lower frequency range (~1500 m/s divided by length of wellbore ~5 km, ≈0.3 Hz). The resonances of the fracture network and some of the surface features will tend to fall in a somewhat higher frequency range, based on feature size and dominant wave-velocity propagations.

Also note that a nearby well can be instrumented and monitored for signals, waves, or pressure changes transferred through the reservoir formation to a nearby well.

As well operators complete more wells in a given formation, there is an attempt to standardize design and optimize well spacing as well as fracture treatment parameters across multiple wells in a multiple well surface location pad or in a formation. The results obtained using methods according to this disclosure may be applied to any new completion designs to optimize recovery based on a better understanding of fracture parameters and fracture results from prior wells.

Figure 10:
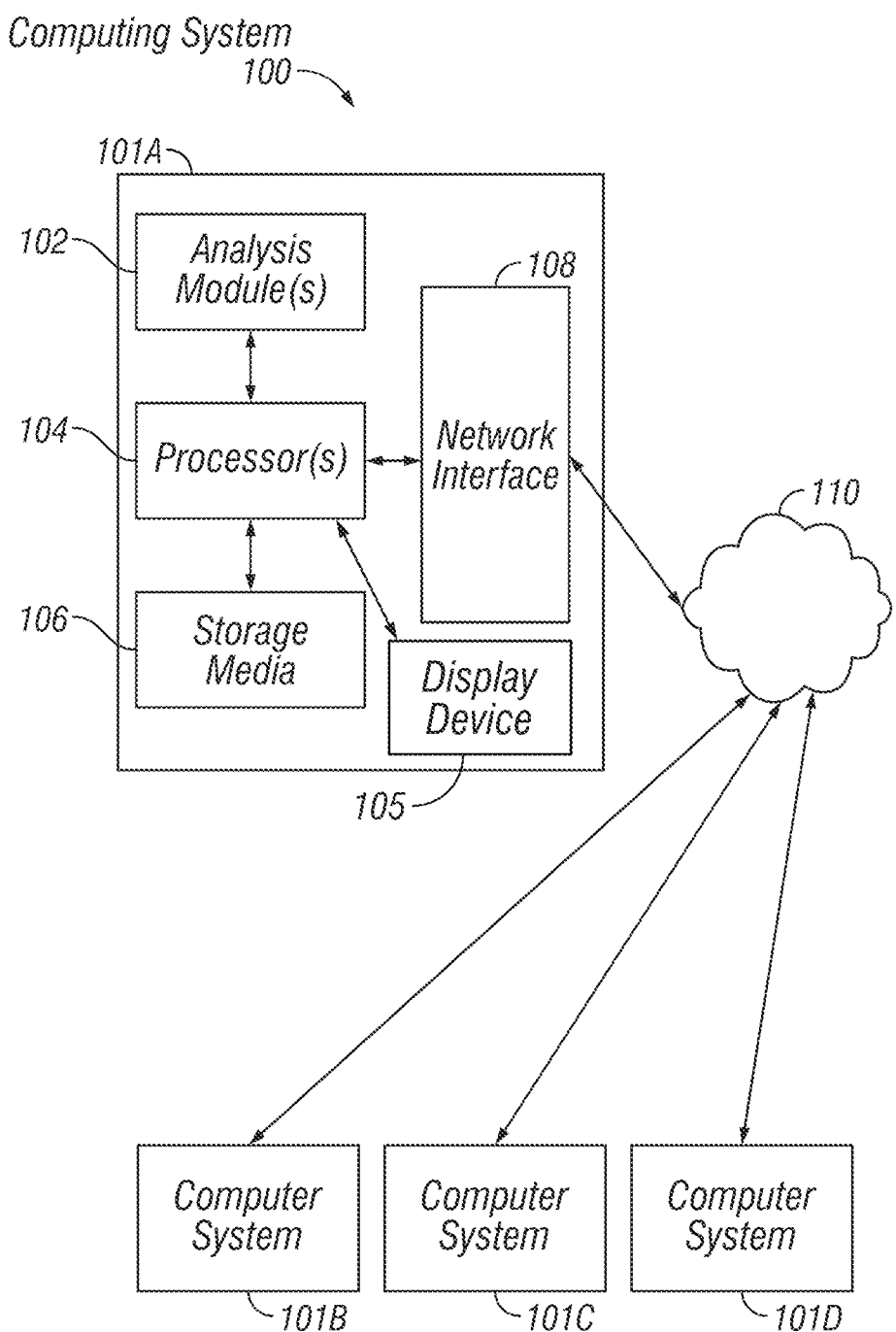
FIG. 10 shows an example computer system that may be used in some embodiments.

FIG. 10 shows an example computing system 100 in accordance with some embodiments. The computing system 100 may be an individual computer system 101A or an arrangement of distributed computer systems. The individual computer system 101A may include one or more analysis modules 102 that may be configured to perform various tasks according to some embodiments, such as the tasks explained with reference to FIGS. 2 through 7. To perform these various tasks, the analysis module 102 may operate independently or in coordination with one or more processors 104, which may be connected to one or more storage media 106. A display device 105 such as a graphic user interface of any known type may be in signal communication with the processor 104 to enable user entry of commands and/or data and to display results of execution of a set of instructions according to the present disclosure.

The processor(s) 104 may also be connected to a network interface 108 to allow the individual computer system 101A to communicate over a data network 110 with one or more additional individual computer systems and/or computing systems, such as 101B, 101C, and/or 101D (note that computer systems 101B, 101C and/or 101D may or may not share the same architecture as computer system 101A, and may be located in different physical locations, for example, computer systems 101A and 101B may be at a well drilling location, while in communication with one or more computer systems such as 101C and/or 101D that may be located in one or more data centers on shore, aboard ships, and/or located in varying countries on different continents).

A processor may include, without limitation, a microprocessor, microcontroller, processor module or subsystem, programmable integrated circuit, programmable gate array, or another control or computing device.

The storage media 106 may be implemented as one or more computer-readable or machine-readable storage media. Note that while in the example embodiment of FIG. 10 the storage media 106 are shown as being disposed within the individual computer system 101A, in some embodiments, the storage media 106 may be distributed within and/or across multiple internal and/or external enclosures of the individual computing system 101A and/or additional computing systems, e.g., 101B, 101C, 101D. Storage media 106 may include, without limitation, one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that computer instructions to cause any individual computer system or a computing system to perform the tasks described above may be provided on one computer-readable or machine-readable storage medium, or may be provided on multiple computer-readable or machine-readable storage media distributed in a multiple component computing system having one or more nodes. Such computer-readable or machine-readable storage medium or media may be considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 100 is only one example of a computing system, and that any other embodiment of a computing system may have more or fewer components than shown, may combine additional components not shown in the example embodiment of FIG. 10, and/or the computing system 100 may have a different configuration or arrangement of the components shown in FIG. 10. The various components shown in FIG. 10 may be implemented in hardware, software, or a combination of both hardware and software, including one or more signal processing and/or application specific integrated circuits.

REFERENCES

Valeri A. Korneev (2011). "Krauklis wave in a stack of alternating fluid-elastic layers." GEOPHYSICS, 76(6), N47-N53.
Nakagawa, S. et al. (2016), Laboratory measurements of guided-wave propagation within a fluid-saturated fracture, *Geophysical Prospecting*, 64, 143-156.
Norris, A. N. (1990). "The speed of a tube wave", *J. Acoust. Soc. Am.*, 87(1), 414-417

Although only a few examples have been described in detail above, those skilled in the art will readily appreciate that many modifications are possible in the examples. Accordingly, all such modifications are intended to be included within the scope of this disclosure as defined in the following claims.

What is claimed is:

1. A method for characterizing a hydraulic fracturing operation in a subsurface formation, comprising:
 inducing a pressure change in a well drilled through the subsurface formation, the pressure change inducing Stoneley waves in the well;
 measuring at a location proximate to wellhead at least one of pressure and a time derivative of pressure in the well for a selected length of time;
 in a computer, determining a rate of rock formation fracturing events occurring during pumping an hydraulic fracturing treatment using the measured at least one of pressure and the time derivative of pressure; and
 adjusting at least one hydraulic fracturing treatment parameter based on the determined rate.

2. The method of claim 1 wherein the inducing a pressure change comprises pumping a hydraulic fracture treatment.

3. The method of claim 1 wherein the inducing a pressure change comprises operating an acoustic source which propagates a pressure pulse into fluid within the well.

4. The method of claim 3 wherein at least one of fluid pumping rate, fluid density, fluid pressure, fluid pressure change, proppant concentration, fluid viscosity, and chemical composition are continuously measured during a pumping of a fracture treatment stage.

5. The method of claim 4 wherein a relationship between fracture treatment pumping parameters and resonances is established, monitored, and optimized in the computer.

6. The method of claim 1 wherein the rate is determined in the computer from at least one of frequency, quality factor and amplitude of a resonance on the measured pressure or time derivative.

7. The method of claim 1 further comprising measuring noise using a plurality of sensors comprising at least one of pressure transducers, hydrophones, accelerometers, microphones, and geophones to reduce surface-based noise and/or to eliminate certain frequencies in the measured at least one of pressure and time derivative of pressure.

8. The method of claim 1 wherein the inducing a pressure change in the wellbore is caused by at least one fracture resonance inside the formation.

9. The method of claim 1 wherein the inducing a pressure change in the wellbore is caused by a resonance inside a wellbore-fracture system, or inside the wellbore itself.

10. The method of claim 1 wherein the fracture resonance is caused by microseismic activity in the formation.

11. The method of claim 1 further comprising in the computer determining a position in the well of at least one of a diameter change in the well, a material property of the well, a fluid property of the wellbore contents, a viscosity of the fluid, a flow blockage in the well, a screenout in the well or a surface imperfection in the well using measurements of reflections of the induced pressure change.

12. The method of claim 1 wherein the rate is determined after completing pumping the hydraulic fracture treatment.

13. The method of claim 1 wherein the inducing a pressure change comprises water hammer generated by changing a flow rate of fluid into or out of the well or into or out of a section of the well.

14. The method of claim 1 further comprising in the computer determining fluid connectivity between the well and a second well by measuring at least one of pressure and time derivative of pressure in the second well.

15. The method of claim 1 further comprising determining stimulated connected volume using the measured at least one of pressure and time derivative of pressure.

16. The method of claim 15 wherein the stimulated connected volume is estimated in the computer using quality factor of at least one resonance in the measured at least one of pressure and the time derivative of pressure.

17. The method of claim 1 further comprising determining an increase in the rate within a selected time interval using the measured at least one of pressure and the time derivative of pressure.

18. The method of claim 17 wherein a number of rock formation fracture events is determined by a resonant frequency amplitude, the number used to determine the rate.

19. The method of claim 17 wherein the increase in the rate is coupled with a feedback system to optimize fracturing parameters to determine a target rate during hydraulic fracturing.

20. The method of claim 1 wherein the at least one physical parameter comprises near wellbore connectivity estimated from dispersion and attenuation of resonances in the measured pressure or pressure time derivative.

21. The method of claim 1 wherein selected parameters are measured and selected characteristics are determined in the computer by comparing the determined at least one physical parameter for each of a plurality of different fracture treatment stages stage to with respect to a normalized value of the at least one physical parameter.

22. A method for characterizing hydraulic fracturing of a subsurface formation, comprising:
  inducing a pressure change in a well drilled through the subsurface formation, the pressure change inducing Stoneley waves in the well;
  measuring at a location proximate to a wellhead at least one of pressure and a time derivative of pressure in the well for a selected length of time;
  in a computer, determining a rate of occurrence of fracturing events in the subsurface formation, at least one physical parameter and a change in the physical parameter with respect to time, of at least one fracture in the subsurface formation using the measured at least one of pressure and the time derivative of pressure; and
  using the determined rate, the determined at least one physical parameter and the time derivative to adjust at least one hydraulic fracture treatment parameter.

23. The method of claim 22 wherein the inducing a pressure change comprises pumping a hydraulic fracture treatment.

24. The method of claim 22 wherein the inducing a pressure change comprises operating an acoustic source which propagates a pressure pulse into fluid within the well.

25. The method of claim 22 wherein the at least one physical parameter and changes in the at least one physical parameter are determined in the computer and parameters comprising fracture fluid pumping rate, fracture fluid density, pressure, pressure change, fracture fluid proppant content, fracture fluid viscosity, and fracture fluid chemical concentration are continuously measured during pumping of at least one fracture stage.

26. The method of claim 22 wherein an increase in the rate is determined in the computer from at least one of resonance strengths and a count of fracture events or micro-seismic events induced within a selected time interval using the measured at least one of pressure and the time derivative of pressure.

27. The method of claim 22 wherein the at least one physical parameter fracture comprises fluid connectivity.

28. The method of claim 22 wherein permeability is determined from dispersion and attenuation of a resonance in the induced pressure change.

29. The method of claim 22 wherein the at least one physical parameter comprises fracture proppant distribution.

30. The method of claim 22 wherein a fracture geometry is estimated using quality factor of at least one resonance in the measured at least one of pressure and the time derivative of pressure.

31. The method of claim 22 wherein the at least one physical parameter comprises fracture length.

32. The method of claim 31 wherein the fracture length is determined from a reflection resonance (frequency) time of the induced pressure change.

33. The method of claim 22 wherein the at least one physical parameter comprises fracture extent determined while pumping fracturing fluid into the well.

34. The method of claim 22 wherein the at least one physical parameter comprises fracture extent determined after pumping fracturing fluid into the well.

35. The method of claim 22 wherein the at least one physical parameter comprises fracture thickness determined while pumping fracturing fluid into the well.

36. The method of claim 22 wherein the at least one physical parameter comprises fracture thickness determined after pumping fracturing fluid into the well.

37. The method of claim 22 wherein the at least one physical parameter comprises fracture length growth rate.

38. The method of claim 22 wherein the at least one physical parameter comprises fracture width growth rate.

39. The method of claim 22 wherein the at least one physical parameter comprises fracture thickness growth rate.

40. The method of claim 22 wherein the at least one physical parameter comprises fracture tip growth rate.

41. The method of claim 22 wherein the at least one physical parameter comprises fracture tip proppant concentration.

42. The method of claim 22 wherein the at least one physical parameter comprises fracture tip distances from the well.

43. The method of claim 22 wherein the at least one physical parameter comprises an estimated fracture closure time or an estimated facture closure rate.

44. The method of claim 22 further comprising in the computer converting the measured at least one of pressure and pressure time gradient to the frequency domain and determining at least one physical parameter of the fracture by spectral analysis of the pressure change or reflections thereof in the well.

45. The method of claim 22 wherein the at least one physical parameter comprises estimating a total number of fractures having a same resonance using a determined amplitude of at least one resonance at a particular frequency.

46. The method of claim 22 further comprising analyzing a quality factor of resonances to estimate fracture geometry.

47. The method of claim 22 further comprising analyzing a quality factor of resonances to estimate fracture network complexity.

48. The method of claim 22 wherein a peak central frequency of a pressure wave resonance is used to determine length and width dimensions of the at least one fracture.

49. The method of claim 22 wherein an amplitude of a peak amplitude frequency of a pressure wave resonance is used to determine a number of fractures having a same length or width dimension.

50. The method of claim 22 wherein a spectral width of at least one resonance in the pressure or pressure time derivative measurements is used in the computer to estimate at least one of a viscosity of fluid in the at least one fracture, a formation fracture permeability, and a product of viscosity and permeability in the at least one fracture.

51. The method of claim 22 further comprising in the computer repeating the determining the at least one physical parameter for a plurality of fractures and comparing the at least one physical parameter for a plurality of different fracture stages in the well, for a plurality of wells, or for a plurality of multiple well surface pads to optimize hydraulic fracturing design.

52. The method of claim 22 further comprising measuring noise using a plurality of sensors comprising at least one of pressure transducers, accelerometers, microphones, and geophones to reduce surface-based noise and/or to attenuate certain frequencies in the measured at least one of pressure and time derivative of pressure.

53. The method of claim 22 wherein a fracture proppant distribution is determined in the computer from at least one of a fracture mouth reflection coefficient and a resonance frequency of the pressure change.

* * * * *